United States Patent [19]

Minalga et al.

[11] 4,413,577
[45] Nov. 8, 1983

[54] PATTERN FEED BALANCING ARRANGEMENT IN AN ELECTRONICALLY CONTROLLED SEWING MACHINE

[75] Inventors: Philip F. Minalga, Piscataway; John W. Wurst, Chester Township, Somerset County, both of N.J.

[73] Assignee: The Singer Company, Stamford, Conn.

[21] Appl. No.: 439,695

[22] Filed: Nov. 8, 1982

[51] Int. Cl.³ .............................................. D05B 3/02
[52] U.S. Cl. ................................ 112/158 E; 112/316
[58] Field of Search ............... 112/158 E, 158 B, 316, 112/317

[56] References Cited
U.S. PATENT DOCUMENTS 4,016,821  4/1977  Minalga ........................ 112/158 E
4,185,571  1/1980  Minalga .

Primary Examiner—Peter P. Nerbun
Attorney, Agent, or Firm—David L. Davis; Robert E. Smith; Edward L. Bell

[57] ABSTRACT

An electronically controlled sewing machine includes an arrangement for utilizing the feed override control to effect a feed balancing function for a pattern having both directions of feed. To effect the balancing function, those patterns which have both forward and reverse feed are "flagged" for recognition by the sewing machine control system. When such a pattern is being sewn, the function of the feed override control is changed to perform the balancing function. Accordingly, when the feed override control is enabled, a fixed increment is added to all forward feeds in the pattern and the feed override control is utilized to attenuate only the forward feeds, to effect a balanced condition.

5 Claims, 4 Drawing Figures

PATTERN FEED BALANCING ARRANGEMENT IN AN ELECTRONICALLY CONTROLLED SEWING MACHINE

DESCRIPTION

BACKGROUND OF THE INVENTION

This invention relates to sewing machines and, more particularly, to electronically controlled sewing machines.

Sewing machines employing sophisticated electronic technology for the storage and subsequent retrieval of stitch pattern information for a multiplicity of patterns have enjoyed great commercial success in recent years. One great advantage of the use of an electronically controlled sewing machine is in its simplicity of operation and control, as perceived by the user. With the recent availability of relatively low cost microcomputers, electronically controlled sewing machines incorporating such a device have greatly increased the versatility of control afforded to the sewing machine operator. Accordingly, sewing machine designers increasingly strive to improve the versatility of the sewing machine while at the same time attempting to keep the number of operator manipulatable control elements to a minimum, so that the operator perceives the use of the machine as relatively simple in nature.

In such a sewing machine, it is common practice to provide an operator manipulatable "balance" control. The term "balance" refers to the fact that feed increments may vary from their intended values under the influence of different fabrics. Thus, patterns of stitches, wherein the sequences contain both forward and reverse feeds, may appear distorted. The severity of the distortion depends upon several factors and cannot be predetermined or preadjusted by the manufacturer. Thus, a "balance" control is typically provided on the machine to allow the operator to adjust the machine for a particular application. In practice, it is recommended that the operator sew the chosen pattern on a scrap of the particular fabric while adjusting the balance control for the most pleasing pattern appearance. Unfortunately, the term "balance control", while technically correct, is not meaningful to sewers which complicates the task in the instruction book of explaining the correct manipulation of this control. It is therefore an object of this invention to simplify both the appearance and use of an electronically controlled sewing machine with respect to the balance control function.

Since the balance control affects the feed increments and since an electronically controlled sewing machine is typically equipped with a stitch length control element, it would therefore be desirable to be able to utilize the stitch length control element for effecting the balancing function. Accordingly, it is a further object of this invention to provide an electronically controlled sewing machine without a separate balance control element and wherein the balance control function is achieved through operator manipulation of the stitch length control element.

SUMMARY OF THE INVENTION

The foregoing and additional objects are attained in accordance with the principles of this invention by providing an electronically controlled sewing machine wherein the stitch length control element is utilized to effect feed balance. Feed balance is only required when the pattern being sewn has both forward and reverse feeds. To effect the balancing function during the sewing of such a pattern, when the stitch length control element is actuated, the feed motion for one of the two directions of feed is increased and the stitch length control element is utilized to attenuate that direction of feed.

BRIEF DESCRIPTION OF THE DRAWINGS

The foregoing will be more readily apparent upon reading the following description in conjunction with the drawings wherein.

DETAILED DESCRIPTION

Figure 1:
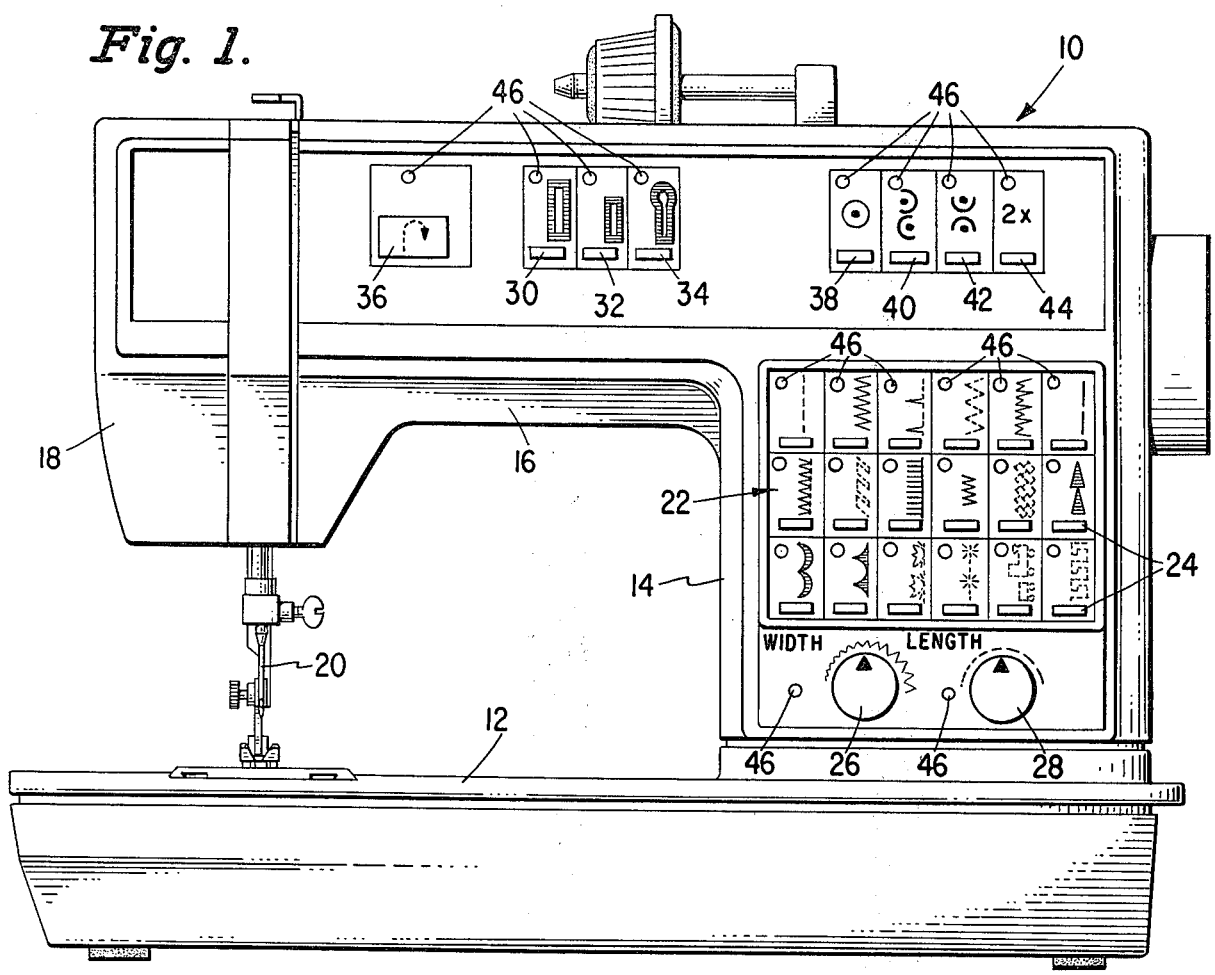
FIG. 1 is a front elevational view of an illustrative sewing machine in which this invention may be incorporated.

Referring now to the drawings, wherein like elements in different figures thereof have the same reference character applied thereto, FIG. 1 shows a sewing machine designated generally by the reference numeral 10. The sewing machine 10 includes a work supporting bed 12, a standard 14, a bracket arm 16 and a sewing head 18. The sewing machine stitch forming instrumentalities include a needle 20 capable of being endwise reciprocated and laterally jogged to form zig zag stitches and a work feed dog (not shown) operating upwardly through slots formed in a throat plate on the bed 12 to transport the work across the bed 12 between needle penetrations. The pattern of stitches produced by operation of the sewing machine 10, i.e., the positional coordinates of each stitch penetration, may be influenced, for example, by data stored in a memory unit and extracted in timed relation with the operation of the sewing machine 10, as is well known in the art.

On the front panel of the sewing machine 10 there is provided an input means whereby the operator can effect control of the functions of the sewing machine. This input means includes switches and dials whereby the operator may select a pattern to be sewn by the sewing machine as well as effecting modifications to the pattern. Pattern selection is effected illustratively through an array 22 of push button switches 24, each of which corresponds to a pattern of stitches, the information for forming which is stored within the memory of the sewing machine 10. Associated with each of the push button switches 24 is a pictorial representation of the pattern as it would be sewn by the sewing machine upon actuation of that switch. The input means also includes a stitch width control (bight override) 26 and a stitch length control (feed override) 28. The controls 26 and 28 each includes a push button switch which is operator actuated to effect the respective width or length modification and includes a rotary portion for setting the magnitude of the modification. There are also provided push button switches 30, 32 and 34 for selecting large buttonhole, small buttonhole and eyelet buttonhole patterns, respectively. A push button switch 36 is providing for reverse sewing. Single pattern selection is effected via a switch 38. The mirror image of a pattern in the bight direction is selected via the switch 40 and the mirror image of the pattern in the feeding direction is selected via the switch 42. The switch 44 is utilized for doubling the length of a sewn pattern. Indicating means for indicating to an operator the status of each of the various functions which may be selected is also provided on the front panel of the sewing machine 10. Illustratively, this takes the form of a plurality of light emitting diodes (LED's) 46 each in close proximity to its respective input switch.

Figure 2:
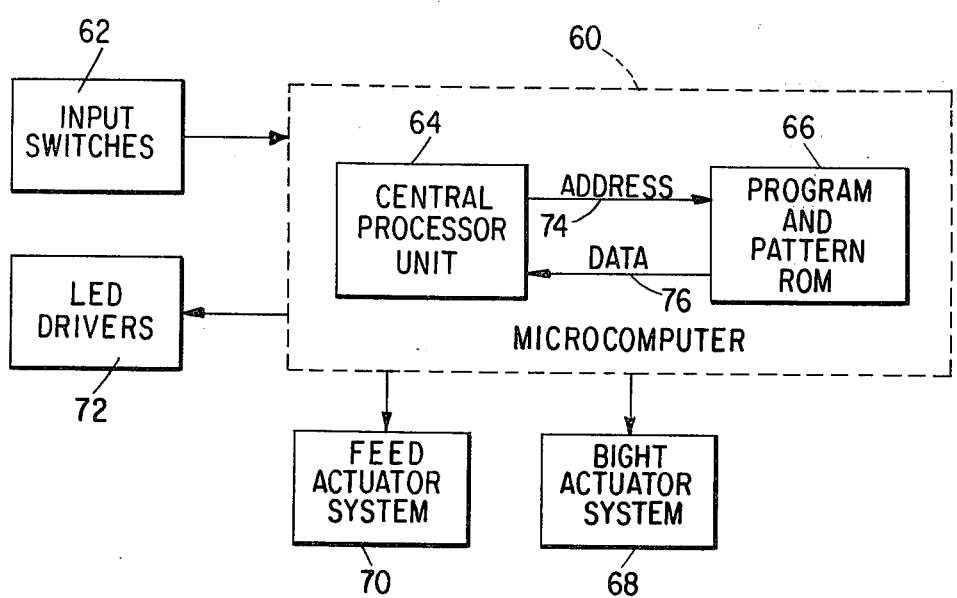
FIG. 2 illustrates a general block diagram of a microcomputer based control system for the sewing machine of FIG. 1.

FIG. 2 shows a general block diagram of a microcomputer based controlled for an electronic stitch pattern sewing machine, which controller may be utilized to control the operation of the sewing machine 10 (FIG. 1) and which operates in accordance with the principles of this invention. Accordingly, the microcomputer 60 receives input signals from the input switches 62 indicative of the functions the sewing machine operator desires to be performed by the sewing machine 10. The input switches 62 may include the pattern selection switches 24 and 30-34 as well as the function switches 26, 28 and 36-44. The microcomputer 60 includes an internal central processor unit (CPU) 64 and a program and pattern ROM 66. The CPU 64 obtains from the ROM 66, in timed relation with the operation of the sewing machine 10, pattern data for controlling the bight actuator system 68 and the feed actuator system 70. The bight actuator system 68 and the feed actuator system 70 are similar in construction and are adapted to convert a digital code word from the microcomputer 60 into a mechanical position which locates the sewing machine needle 20 in a conventional stitch forming instrumentality and provides a specific work feed for each needle penetration, respectively, as is well known in the art. The microcomputer 60 also provides signals to the LED driver 72 to control the illumination of the LED's 46 (FIG. 1) to indicate the function selected by the sewing machine operator. Illustratively, the microcomputer 60 is a type TMS 7040 microcomputer manufactured by Texas Instruments wherein the CPU 64 provides addresses to the ROM 66 over the line 74 and receives in return bytes of data and program over the lines 76. In addition to the ROM 66, the microcomputer 60 also includes read/write memory and registers which the CPU 64 utilizes during execution of its internal program stored in the ROM 66.

Figure 3:
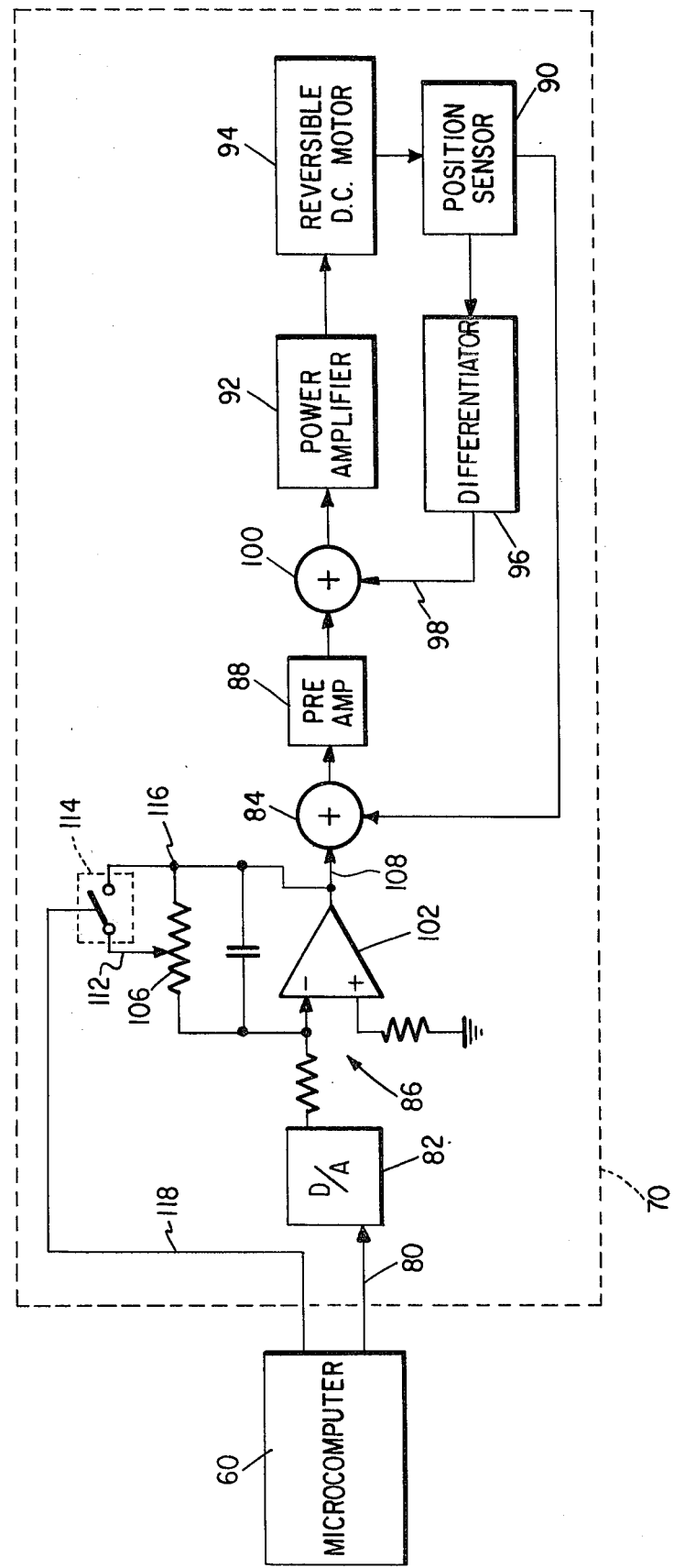
FIG. 3 is a schematic block diagram illustrating the feed actuator system and the manner in which stitch length control by the operator is effected in order to achieve the balance function.

FIG. 3 illustrates the feed actuator system 70 and its connection to the microcomputer 60. At the appropriate time, as is well known in the art, the microcomputer 60 outputs over the leads 80 to the feed actuator system 70 a digital code word representing the magnitude and direction of feed motion for each stitch. A digital to analog converter 82 converts this digital code word into an analog voltage which is applied to a summing junction 84 through a preamplifier stage 36. The summing junction 84 is the input to a closed loop servo system for controlling the feed actuator. The closed loop servo system includes an outer position loop and an inner rate loop. The position loop includes the preamplifier 88, the rate loop and the position sensor 90. The rate loop includes the power amplifier 92 which supplies direct current of reversible polarity to an electromechanical actuator 94, which in the broadest sense comprises a reversible DC motor, to position the actuator 94 in accordance with the input signal to the summing junction 84, derived from the output of the digital to analog converter 82. The feedback position sensor 90 is mechanically connected to the reversible motor 94 and provides a feedback position signal which is differentiated with respect to time in a differentiator 96 to provide a rate signal. This rate signal is provided on the line 98 to the summing junction 100 of the power amplifier 92 to modify the position signal at that point. For a complete description of circuitry forming the closed loop servo system, the reader is referred to U.S. Pat. No. 4,106,821.

The preamplifier stage 86, through which the analog output of the digital to analog converter 82 passes before reaching the closed loop servo system, includes an operational amplifier 102, an input resistor 104 and a feedback resistor 106. As is well known in the art, the ratio of the output voltage of the preamplifier stage 86 on the lead 108 to the input voltage on the lead 110 is equal to the ratio of the value of the feedback resistor 106 to the value of the input resistor 104. Illustratively, the feedback resistor 106 and the input resistor 104 are chosen to be equal in value so that the nominal gain of the preamplifier stage 86 is one volt per volt. However, the feedback resistor 106 is actually a potentiometer whose wiper 112 is connected through a controllable analog switch 114 to one end 116 of the resistor 106 so that when the analog switch 114 is closed, a portion of the resistor 106 is short circuited. Accordingly, when this is the case, the effective feedback resistance of the operational amplifier 102 is reduced and thus the gain of the preamplifier stage 86 is reduced. Thus, by moving the wiper 112, the response of the feed actuator 94 to the output of the microcomputer 60 can be selectively attenuated. The microcomputer 60 controls closure of the switch 114 via the control lead 118 to make effective such response. As has been discussed above, the stitch length control 28 includes a push button switch which is operator actuated to effect the length modification and further includes a rotary portion for setting the magnitude of such modification. The rotary portion of the control 28 is coupled to the wiper arm 112 of the potentiometer 106. The push button switch of the control 28 is an input to the microcomputer 60 which recognizes actuation thereof by the operator to provide a control signal at the appropriate time on the lead 118 to close the switch 114.

Figure 4:
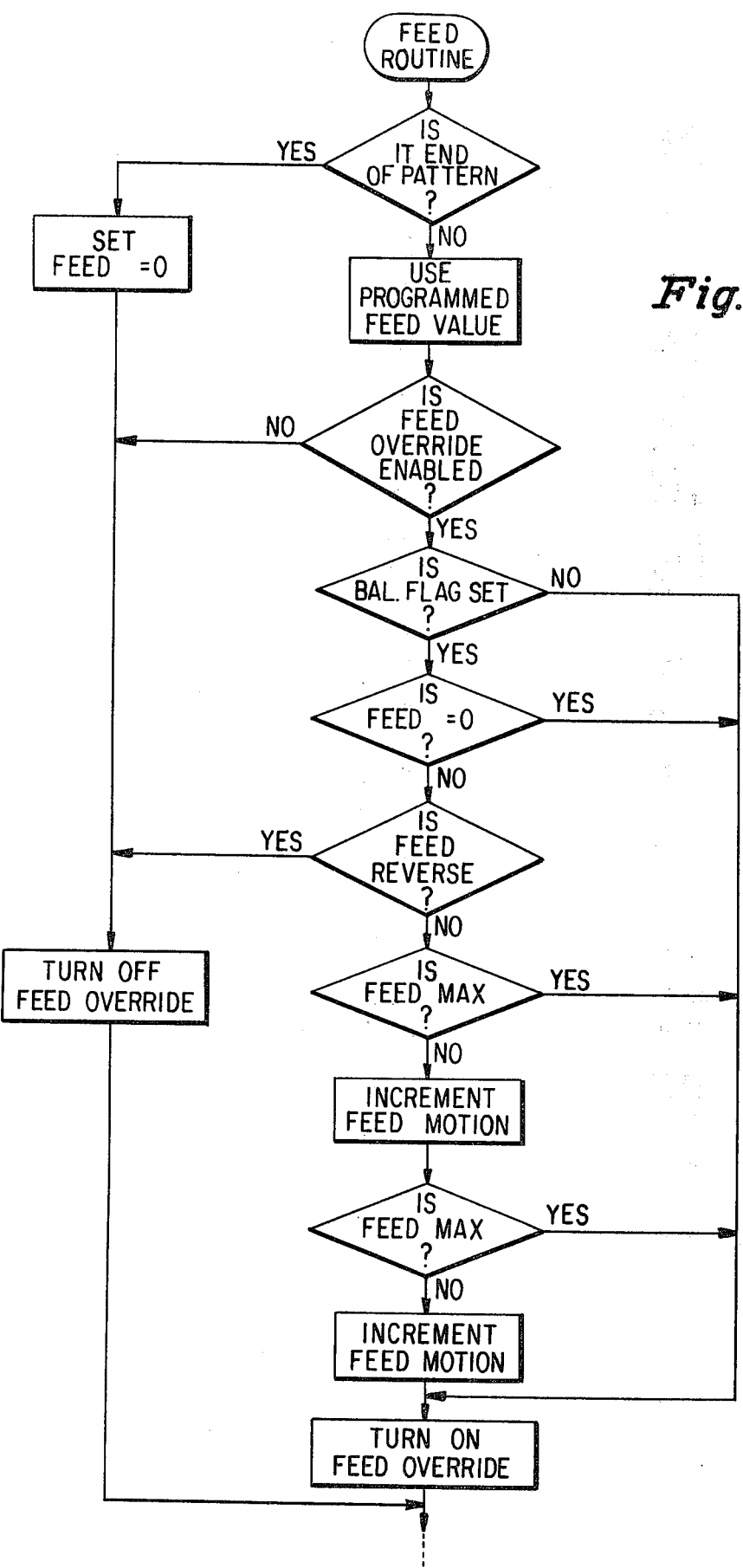
FIG. 4 is a flow chart of a portion of the feed subroutine for operating the microcomputer of FIGS. 2 and 3 in accordance with the principles of this invention.

In accordance with the principles of this invention, the stitch length control 28 is utilized to effect a balancing function for those patterns for which balancing is appropriate. Within the microcomputer 60, each stored pattern has associated therewith a plurality of flag bits which define certain characteristics of the pattern. For example, the three buttonhole patterns are flagged to indicate that they are buttonhole patterns. Other patterns are flagged in accordance with whether or not various functions are available for the pattern such as, for example, the single pattern function. In accordance with the principles of this invention, only certain patterns are flagged to indicate that balancing is appropriate. Such patterns include those which have both directions of feed, but not every pattern which has both directions of feed may be balanced. Thus, the microcomputer 60 operates in accordance with the flow chart shown in FIG. 4 to effect the balancing function where appropriate and when desired by the operator. As shown in FIG. 4, when the microcomputer 60 enters the feed routine once each stitch forming cycle, it first checks to see whether this is the last stitch in the pattern. If so, the feed is set to zero and this value is transmitted to the feed actuator system 70. The microcomputer 60 then turns off the feed override by providing a signal on the line 118 to open the switch 114. If the stitch is not the last stitch in the pattern, the microcomputer 60 uses the programmed feed value and holds that feed value in an appropriate register. The microcomputer 60 then checks to see whether the feed override has been enabled by the operator. The operator enables the feed override by pushing the push button switch which forms a part of the stitch length control 28. If the feed override is not enabled, the microcomputer 60 turns off the feed override to open the switch 114. If the feed override has been enabled, the microcomputer 60 then examines the balance flag associated with the pattern being sewn to see whether that flag is set to indicate that the pattern being sewn is a balanceable pattern. If not, the feed override is turned on by placing an appropriate signal in the lead 118 to close the switch 114. If the pattern is a balanceable pattern, and the feed value is zero, the feed override is turned on. If the feed is not zero, the microcomputer 60 checks to see whether for that particular stitch, feeding is in the reverse direction. If so, the feed override is turned off. If the feed for that stitch is not in the reverse direction, at this point the microcomputer 60 has determined that the operator has enabled the feed override, the pattern is a balanceable pattern and feeding is in the forward direction. The microcomputer 60 then increments the feed value by two increments, but only up to the maximum permissible feed. After the feed value is incremented, the feed override is turned on. After the feed override is either turned on or turned off, the microcomputer 60 continues operating in accordance with the remainder of its feed routine, which will not be described in any further detail herein.

The foregoing discussion has referred to incrementing the feed motion. It is understood that to do this incrementing, it is possible that the digital code word extracted from the ROM 66 may actually be decremented. However, it is recognized that the change to the extracted code word must be such that the feed motion for that one direction of feed (i.e., forward) is increased so that it can subsequently be attenuated by movement of the wiper 112 to achieve a balanced condition. It is also understood that the chosen direction for increasing the feed motion may be the reverse direction of feed.

The astute reader will recognize that addition of a fixed length to the feed increment, rather than a proportional length, introduces a distortion into the pattern design. However, experimentation has shown that, when balance is reestablished, the distortion is so subtle as to be nearly unnoticeable. Also, although this invention has been illustrated with an increment of two, it is understood that the use of other incremental values also falls within the contemplated scope of this invention. It is also possible to subdivide the range of feeds and provide different imcrements for the different subdivisions.

Accordingly, there has been disclosed an arrangement for utilizing the sewing machine feed override control to effect a feed balancing function for a pattern having both directions of feed. It is understood that the above-described embodiment is merely illustrative of the application of the principles of this invention. Numerous other embodiments may be devised by those skilled in the art without departing from the spirit and scope of this invention, as defined by the appended claims.

We claim:

1. In an electronically controlled sewing machine having stitch forming instrumentalities positionally controlled over a predetermined range between stitches to produce a pattern of feed and bight controlled stitches, said stitch forming instrumentalities including a feed regulating mechanism positionable for two directions of feed; means for storing pattern stitch feed and bight information; means operating in timed relation with said sewing machine for extracting said pattern stitch information from said storing means; separate feed and bight actuating means responsive to said extracted pattern stitch information for influencing the feed and bight motions, respectively, of said stitch forming instrumentalities to produce a pattern of stitches corresponding to said extracted pattern stitch information; and an operator actuable and influencable feed override means for selectively attenuating the response of said feed actuating means to the extracted feed information;

an arrangement for utilizing said feed override means to effect a feed balancing function for a pattern having both directions of feed comprising:

means responsive to operator actuation of said feed override means for operating on the extracted feed information for only one of said feed directions to increase the feed motion for said one feed direction; and means responsive to operator actuation of said feed override means for making effective operator influence of said feed override means for only said one feed direction.

2. The arrangement according to claim 1 wherein said operating means includes incrementing means for increasing the feed motion by a fixed increment.

3. The arrangement according to claim 2 wherein said feed information is stored in digital form in said storing means and said incrementing means is operative to change the extracted feed information by a digital value corresponding to said fixed increment of feed motion.

4. The arrangement according to claim 3 wherein said feed information is represented by a digital code word and said incrementing means algebraically changes said code by two increments in a direction to increase the feed motion.

5. The arrangement according to claim 1 wherein said operating means includes means for preventing the feed motion from being increased beyond a predetermined value.

* * * * *